(12) United States Patent
Bourgeois

(10) Patent No.: US 11,700,966 B1
(45) Date of Patent: *Jul. 18, 2023

(54) OUTDOOR SEAFOOD BOILING APPARATUS

(71) Applicant: METAL FUSION, INC., Jefferson, LA (US)

(72) Inventor: Norman Bourgeois, Jefferson, LA (US)

(73) Assignee: Metal Fusion, Inc., Jefferson, LA (US)

( * ) Notice: Subject to any disclaimer, the term of this patent is extended or adjusted under 35 U.S.C. 154(b) by 149 days.

This patent is subject to a terminal disclaimer.

(21) Appl. No.: 17/229,422

(22) Filed: Apr. 13, 2021

Related U.S. Application Data

(63) Continuation of application No. 16/159,933, filed on Oct. 15, 2018, now Pat. No. 10,973,358, which is a continuation of application No. 15/188,326, filed on Jun. 21, 2016, now Pat. No. 10,098,493, which is a continuation-in-part of application No. 14/480,137, filed on Sep. 8, 2014, now Pat. No. 9,675,198, which is a continuation of application No. 13/208,551, filed on Aug. 12, 2011, now Pat. No. 8,826,807.

(60) Provisional application No. 62/183,534, filed on Jun. 23, 2015, provisional application No. 61/405,983, filed on Oct. 22, 2010, provisional application No. 61/373,069, filed on Aug. 12, 2010.

(51) Int. Cl.
*A47J 37/12* (2006.01)
*A47J 27/04* (2006.01)

(52) U.S. Cl.
CPC .............. *A47J 27/04* (2013.01); *A47J 37/12* (2013.01); *A47J 37/128* (2013.01); *A47J 37/1242* (2013.01); *A47J 37/1295* (2013.01); *A47J 2027/043* (2013.01)

(58) Field of Classification Search
CPC .. A47J 36/12; A47J 36/06; A47J 27/04; A47J 37/12; A47J 37/128; A47J 37/1242; A47J 37/1295; B65F 2001/1669
USPC ......... 99/403, 407, 409, 413, 415, 418, 450; 220/810, 831, 832, 845
See application file for complete search history.

(56) References Cited

U.S. PATENT DOCUMENTS

| | | | | |
|---|---|---|---|---|
| 3,714,889 A | * | 2/1973 | Mazzola | A47J 37/12 219/415 |
| 3,908,531 A | * | 9/1975 | Morley | A47J 37/1219 99/336 |
| 3,975,070 A | * | 8/1976 | Barteau | A47J 37/1271 312/319.1 |

(Continued)

*Primary Examiner* — Reginald Alexander
(74) *Attorney, Agent, or Firm* — Roy Kiesel Ford Doody & North, APLC; Brett A. North

(57) ABSTRACT

An outdoor food frying apparatus includes a frame having a pot support, a burner element supported upon the frame, and a pot that removably fits the frame. The pot has end walls, a rear wall, a front edge portion, and a bottom wall. A basket is pivotally attached to the pot rear wall with one or more hinges. The basket is correspondingly sized and shaped to fit the pot interior. The basket is movable about the hinge between cooking and food discharge positions. The lid is pivotally attached to the pot. The lid is movable between a cooking position wherein the lid covers the pot upper opening and food discharge position wherein the lid rotates at least 180 degrees from said cooking position, forming a tray for receiving food discharged from the basket. A steamer plate can optionally be connected to the basket at the basket rim and/or basket side walls.

17 Claims, 11 Drawing Sheets

(56) References Cited

U.S. PATENT DOCUMENTS 4,450,757 A \* 5/1984 Alfio ....................... A47J 27/18
99/336

\* cited by examiner

OUTDOOR SEAFOOD BOILING APPARATUS

CROSS-REFERENCE TO RELATED APPLICATIONS

This is a continuation of U.S. patent application Ser. No. 16/159,933, filed on Oct. 15, 2018 (now U.S. Pat. No. 10,973,358, issued on Apr. 13, 2021), which is is a continuation of U.S. patent application Ser. No. 15/188,326, filed on Jun. 21, 2018 (now U.S. Pat. No. 10,098,493, issued on Sep. 16, 2018), which claims benefit of U.S. Provisional Patent Application Ser. No. 62/183,534, filed 23 Jun. 2015. This is also a continuation of U.S. patent application Ser. No. 15/188,326, filed on Jun. 21, 2018 (issuing as U.S. Pat. No. 10,098,493 on Sep. 16, 2018), which is a continuation in part of U.S. patent application Ser. No. 14/480,137, filed 8 Sep. 2014 (now U.S. Pat. No. 9,675,198, issued on Jun. 13, 2017), which is a continuation application of U.S. patent application Ser. No. 13/208,551, filed 12 Aug. 2011 (now U.S. Pat. No. 8,826,807, issued on 9 Sep. 2014), which is a nonprovisional of and claims the benefit of both U.S. Provisional Patent Application Ser. No. 61/373,069, filed 12 Aug. 2010, and U.S. Provisional Patent Application Ser. No. 61/405,983, filed 22 Oct. 2010, all of the above referenced patent applications and/or patents are hereby incorporated herein by reference and priority to/of all is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to gaseous fueled fired outdoor frying devices such as deep fat fryers. More particularly, the present invention relates to an improved outdoor frying apparatus having a specially configured pot and a basket with shallow and deep sections that fits the pot interior, the basket being pivotally connected to the pot at a hinge and along a first edge of the pot, the basket having a ramp section opposite the hinge for camming or biasing or pushing cooked food items to gravitate toward the deep section of the basket as the basket is rotated from a cooking position to a dumping position. The pot has a configuration that corresponds to and conforms generally to the basket. A specially configured steaming arrangement is provided that enables the apparatus to both boil/steam food items (e.g., crabs, shrimp, crawfish and the like).

2. General Background of the Invention

Many food frying devices have been patented. Examples can be found in the following table.

The following U.S. Patents and Publications are incorporated herein by reference:

| PAT. NO./ PAT. PUBL. | TITLE | ISSUE DATE/ PUBL. DATE MM-DD-YYYY |
|---|---|---|
| 2,550,758 | French Fryer | May 1, 1951 |
| 2,707,428 | Food Boiling Apparatus | May 3, 1955 |
| 3,714,889 | Outdoor Deep Fryer | Feb. 6, 1973 |
| 3,971,307 | Deep Fat Fryer | Jul. 27, 1976 |
| 3,975,070 | Flour and Batter Apparatus | Aug. 17, 1976 |
| 4,250,803 | Deep Fryer | Feb. 17, 1981 |
| 4,420,006 | Spray Cleaning System for Frying Apparatus | Dec. 13, 1983 |
| 4,580,024 | Microwave Deep Fat Fryer | Apr. 1, 1986 |
| 4,623,544 | Constant Temperature Fryer/Cooker Assembly | Nov. 18, 1986 |
| 5,209,218 | Deep Frying Apparatus | May 11, 1993 |
| 5,398,668 | Deep Frying Apparatus | Mar. 21, 1995 |
| 5,577,438 | Gas Fired Deep Fat Fryer | Nov. 26, 1996 |
| 5,642,660 | Gas Fired Deep Fat Fryer | Jul. 1, 1997 |
| 5,918,535 | Apparatus for Suspending an Inner Basket Within an Outer Pot of a Cooking Vessel, and Method for Using Same | Jul. 6, 1999 |
| 8,826,807 | Outdoor Seafood Boiling Apparatus | Sep. 9, 2014 |
| 2006/0260602 | Cooking Apparatus | Nov. 23, 2006 |

The following applications and patents are also hereby incorporated herein by reference:

U.S. patent application Ser. No. 14/480,137, filed 8 Sep. 2014, which is a continuation application of U.S. patent application Ser. No. 13/208,551, filed 12 Aug. 2011 (now U.S. Pat. No. 8,826,807, issued on 9 Sep. 2014), which is a nonprovisional of and claims benefit of U.S. Provisional Patent Application Ser. No. 61/373,069, filed 12 Aug. 2010, and U.S. Provisional Patent Application Ser. No. 61/405, 983, filed 22 Oct. 2010.

BRIEF SUMMARY OF THE INVENTION

The present invention provides a food frying apparatus for use in an outdoor setting. The apparatus includes a frame fitted with one or more burner elements supported upon the frame, the burner element(s) being positioned below a pot that is supported by the frame. The pot can be eccentrically shaped to concentrate more of the pot total volume near a provided pivotal connection, hinged connection, or hinge that joins a basket to the pot. The pot rests upon the base, the pot having a bottom wall, side walls and an open top.

The present invention provides an outdoor food frying apparatus that includes a frame having a pot support, a burner element supported upon the frame, and a pot that can removably fit the frame. The pot has end walls, a rear wall, a front edge portion, and a bottom wall that gradually increases in curvature from the rear wall to the front edge portion. A basket can be pivotally attached to the pot rear wall with one or more hinges. The basket can be correspondingly sized and shaped to fit the pot interior. The basket can be movable about the hinge between cooking and food discharge positions. The lid can be pivotally attached to the pot. The lid can be movable between a cooking position wherein the lid covers the pot upper opening and food discharge position wherein the lid rotates at least 180 degrees from the cooking position, forming a tray for receiving food discharged from the basket. A steamer plate can optionally be connected to the basket at the basket rim and/or basket side walls.

A basket can be sized and shaped to conform to the shape of the pot and occupy the pot interior, the basket pivotally connecting to the pot along a pot edge and with the hinge or hinged connection.

A pot lid removably fits and covers the open top. The lid can be pivotally or hingedly connected to the frame.

The apparatus optionally employs a steaming plate that can be supported by the basket.

The present invention provides a seafood boiler apparatus including a base and a pot that rests upon the base.

The pot can have a bottom wall, side walls, an open top, a pot shallow end portion and a pot deep end portion.

A basket can be sized and shaped to occupy the pot interior, and the basket can have an upper rim that includes a rim front edge, rim sides and a rear edge.

The basket can be pivotally connected to the pot at a hinge located next to the rear edge.

A pot lid can removably fit and cover the open top.

The pot depth gradually decreasing from a maximum depth vertically below the pivot to a minimum depth at a position spaced farthest away from the hinge.

A steamer plate can optionally fit inside the basket.

A plurality of hangers can preferably enable the steamer plate to connect with the basket rim.

In one embodiment, at least one side wall preferably has a partial elliptical shape.

In one embodiment, at least two of the side walls preferably has a partial elliptical shape.

In one embodiment, the pot bottom wall can be curved.

In one embodiment, the lid can be hingedly attached to the pot.

In one embodiment, the lid can be rotatably attached to the pot.

In one embodiment, the pot preferably has a hinge mounted above the pot deep end portion, the lid preferably being rotatably attached to the pot at the hinge.

In one embodiment, the lid can be rotatably attached to the pot and can further comprise multiple stops that enable the lid to be opened to different positions. The lid positions can form different angles with the top of the pot.

In one embodiment, one of the angles can be an obtuse angle.

In one embodiment, one of the angles can be an angle of about 180 degrees.

The present invention provides a seafood boiler apparatus comprising a frame having a pot support, a burner element supported upon the frame, and a pot that removably fits the frame.

The pot can have end walls, a rear wall, a front edge portion, and an inclined bottom wall that can gradually change the water depth in the pot from a deep pot depth next to the rear wall to a shallow pot depth next to the front edge portion. The bottom can connect between the rear wall and the front edge portion. The bottom wall can connect to each of the end walls.

A basket can be pivotally attached to the pot rear wall, the basket can be correspondingly sized and shaped to the pot so that it can fit within the pot interior.

The basket can be movable about the hinge between cooking and food discharge positions.

The basket can have flat side walls, a curved bottom wall and a rear wall.

A lid can be movably attached to the pot. The lid can be movable between a cooking position wherein the lid covers the pot upper opening and food discharge position wherein the lid rotates through at least an obtuse angle from the cooking position. The lid can form a tray for receiving food discharged from the basket when the basket rotates to the discharge position.

A steamer plate can optionally fit inside the basket.

A plurality of hangers can enable the steamer plate to connect with the basket rim.

In one embodiment, the pot bottom wall can be curved.

In one embodiment, each of the two pot end walls preferably have a partial elliptical shape.

In one embodiment, the pot bottom wall can preferably be elliptically curved.

In one embodiment, the lid can preferably be pivotally attached to the pot.

In one embodiment, the lid can preferably be rotatably attached to the pot.

In one embodiment, the basket rear wall can preferably be a planar rear wall that forms a connection with a basket hinge.

In one embodiment, the basket can preferably pivotally connect to the pot with a pinned hinged connection that can be removable so that the basket can be separated from the pot by removing the pinned hinged connections.

The present invention includes a seafood boiler apparatus comprising a base, a pot that rests upon the base, the pot having a bottom wall, side walls, an open top, a pot shallow end portion and a pot deep end portion.

A basket can be sized and shaped to occupy the pot interior, the basket having an upper rim that includes a rim front edge, rim sides and a rear edge and pivotally connecting to the pot at a hinge located next to the rear edge.

A pot lid can be removably fits and covers the open top.

A moveable lid support can be attached to the base and can extend behind the base and below the pivot, the movable lid support enabling a support of the lid in multiple angular positions including at least one position that forms an obtuse angle with a horizontal plane and a second position that forms an angle that is smaller than the obtuse angle.

The lid support can include multiple connectors on the base at vertically spaced apart positions and a moving frame that extends between the lid and a selected one of the connectors.

In one embodiment, the apparatus further comprises a steamer plate that can fit inside the basket.

In one embodiment, the apparatus further comprises a plurality of hangers that can enable the steamer plate to connect with the basket rim.

In one embodiment, the apparatus further comprises a burner element supported upon the frame.

In one embodiment, the apparatus further comprises one or more inclined baffle plates supported on the frame.

In one embodiment, one or more baffle plates can extend from a position near the pot bottom wall to a position about even with the top of the burner element.

The present invention includes a seafood boiler apparatus comprising a frame having a pot support. A burner element can be supported upon the frame. A pot can removably fit the frame, the pot having end walls, a rear portion, a front portion, and a bottom wall, the bottom wall connecting between the rear portion and the front portion, the bottom wall connected to each of the end walls.

A basket can be pivotally attached to the pot rear wall, the basket can be correspondingly sized and shaped to the pot so that it fits within the pot interior, the basket being movable between cooking and food discharge positions.

A lid can be movably attached to the assembly of base and pot, the lid being movable between a cooking position wherein the lid covers the pot upper opening and multiple food discharge positions wherein the lid rotates through at least an obtuse angle from the cooking position, wherein the lid forms a generally horizontally positioned tray for receiving food discharged from the basket when the basket rotates to a first discharge position.

The lid can be supported in an inclined position that forms an obtuse angle with the lid cooking position in a second discharge position.

A movable support that can enable selective support of the lid in either the first or the second discharge position.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
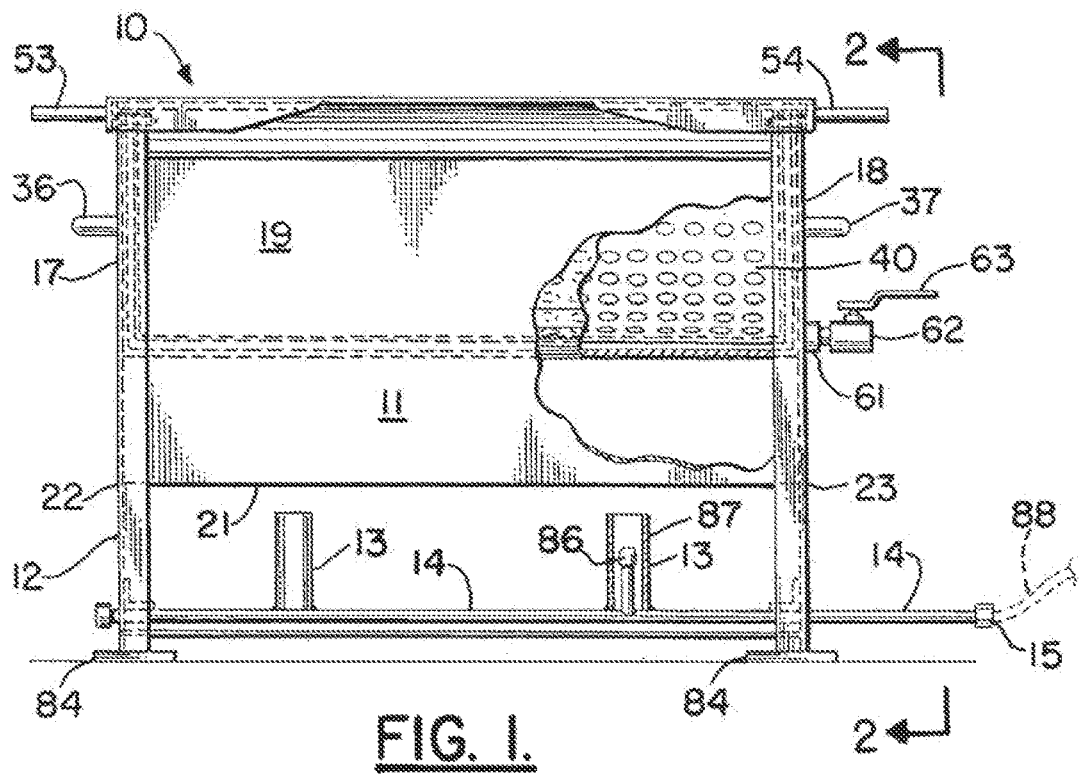
FIG. 1 is a front perspective view of a preferred embodiment of the apparatus of the present invention.
Figure 2:
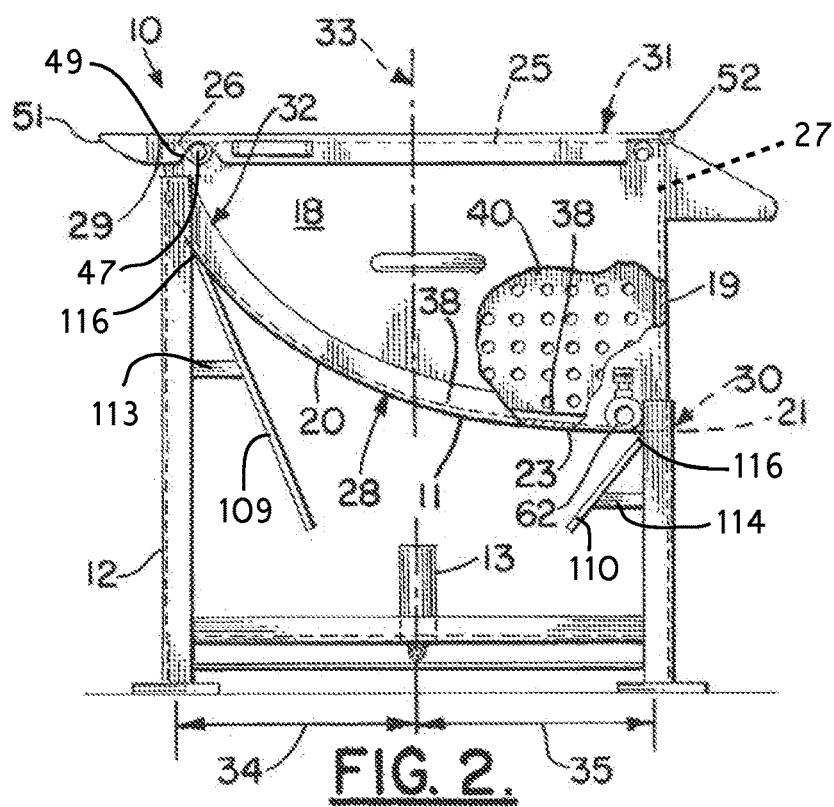
FIG. 2 is a side view of a preferred embodiment of the apparatus of the present invention.
Figure 3:
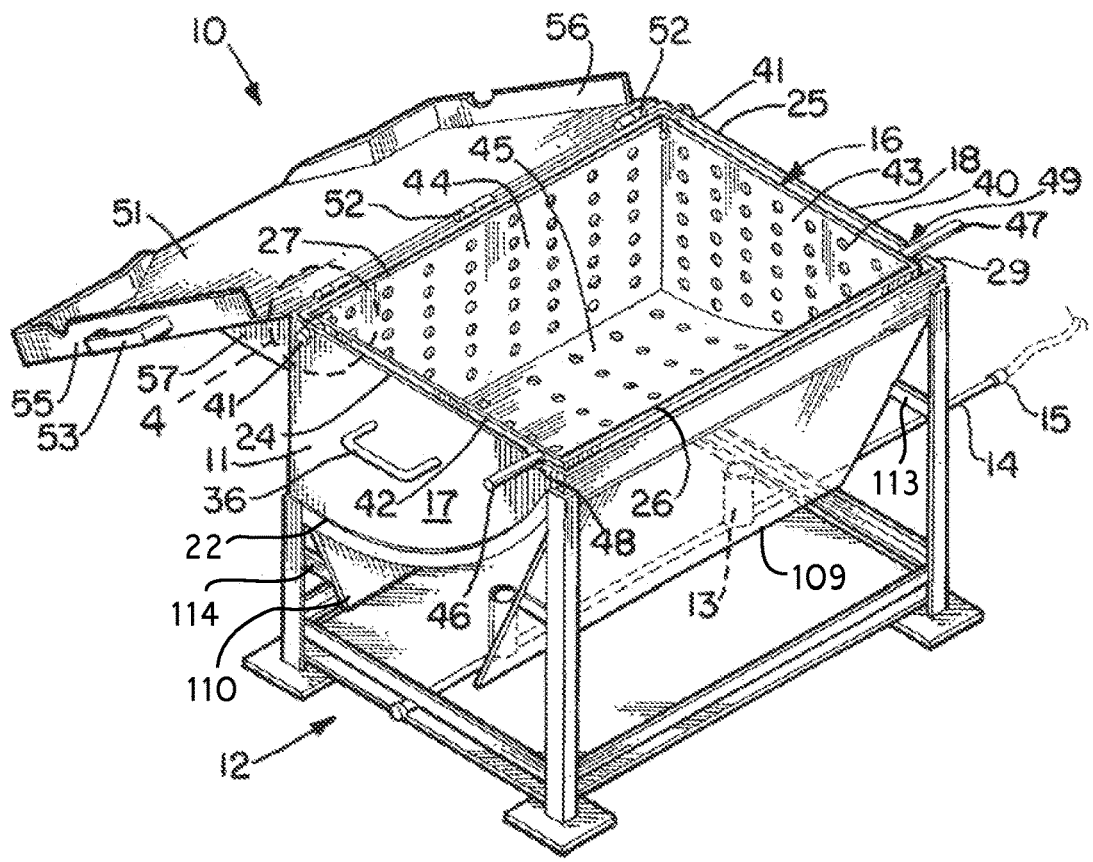
FIG. 3 is a perspective view of a preferred embodiment of the apparatus of the present invention.
Figure 4:
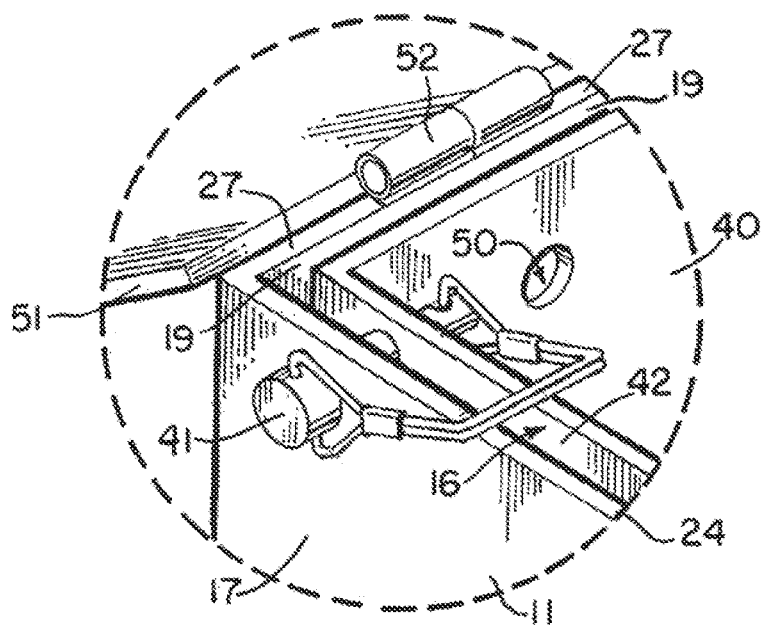
FIG. 4 is a fragmentary perspective view of a preferred embodiment of the apparatus of the present invention.
Figure 5:
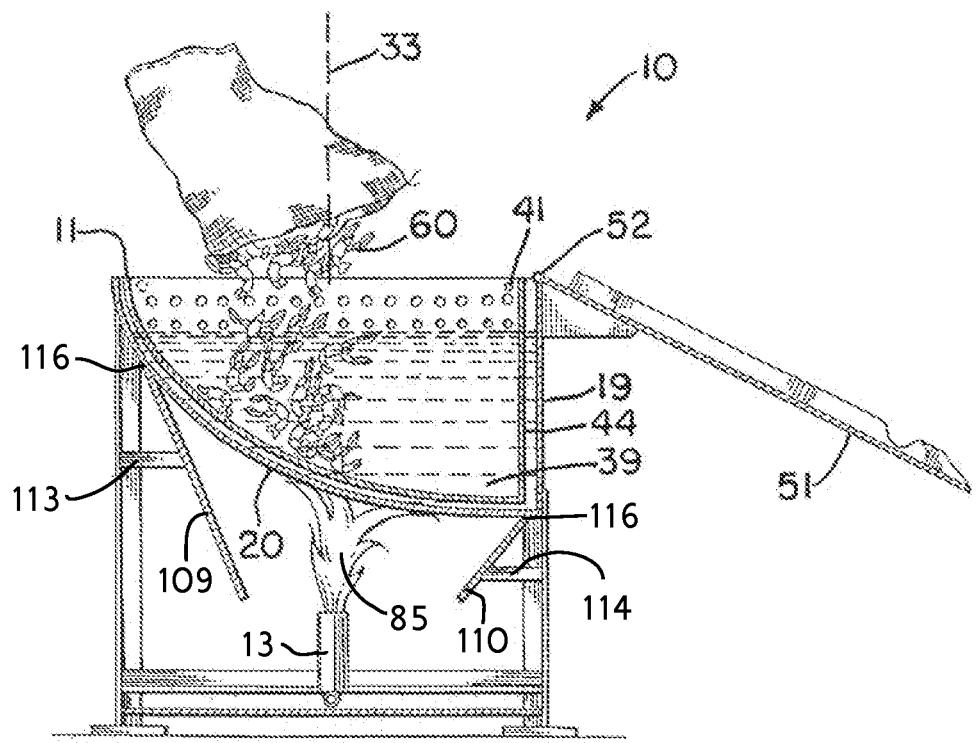
FIG. 5 is a side sectional view of a preferred embodiment of the apparatus of the present invention.

FIGS. 1-8 show a preferred embodiment of the apparatus of the present invention designated generally by the numeral 10. Apparatus 10 is preferably of welded steel or welded aluminum construction. As shown in FIGS. 1 and 3, outdoor frying apparatus 10 provides a base or frame 12. The frame or base 12 can be somewhat elevated, supported on a plurality of legs or feet 84. Burner element or elements 13 are supported on frame or base 12 for generating a flame or flames 85 for transferring heat to a cooking vessel or pot 11. A fuel supply line 14 can be in the form of a pipe that supplies fuel to each burner element 13. The burner elements 13 are conventional in that they can comprise a burner jet 86 inside of a vertically positioned open ended pipe or tube 87. Such burner elements 13 are commercially available. Fuel supply line 14 is provided with an influent fitting 15 for enabling a connection to be made to a fuel supply hose 88 that is connected to a source of fuel such as a pressurized canister of propane or butane or a source of natural gas. Baffle plates 109, 110 can be supported on frame or base 12 in an inclined position. Each baffle plate 109, 110 can be secured to frame or base 12 with connector 113, 114 that extends from frame 12 to a position along the edge of plate 109, 110. The top portion of plates 109, 110 can be secured to frame 12 with a welded connection 116. Baffle plates can concentrate the heat generated from burner elements 13 onto the bottom of a cooking vessel or pot 11. Each plate 109, 110 starts at a position at the pot bottom and extends to a position about even with the top of a burner element 13. A gap is provided in between plates 109, 110 and burner element 13 to allow airflow.

Pot 11 has a pot interior 16 that is receptive of basket 40. Pot 11 has a pair of opposed end walls 17, 18, a rear wall 19, and a bottom wall 20. A seam or joint (for example, welded connection) 21 joins pot rear wall 19 to pot bottom wall 20. A curved seam or curved joint 22 (e.g. welded) joins end wall 17 to pot bottom wall 20. Similarly, a curved seam or curved joint 23 joins end wall 18 to pot bottom wall 20 (see FIGS. 1-3).

Each end wall 17, 18 has an upper edge 24, 25. End wall 17 has upper edge 24. End wall 18 has upper edge 25. Rear wall 19 has upper edge 27. An upper edge 26 is provided as an end of bottom wall 20. The upper edge 26 is generally opposite and can be parallel to upper edge 27 (see FIG. 3).

Each of the curved joints or seams 22, 23 provides a curvature 28 that gradually increases in curvature between upper edge 26 and seam 21 (see FIGS. 1-2). As an example, each of the end walls 17, 18 can be in the shape of a part (e.g., one fourth) of an ellipse. In the drawings, a reference point 29 is the intersection of upper edge 26 and upper edge 25 (see FIGS. 2 and 3). Another reference point 30 is the intersection of rear wall 19 and bottom wall 20 (see FIG. 2). The curvature between reference points 29 and 30 gradually increases beginning at reference point 29 with a smaller radius of curvature for the curvature 28 or curved seam or joint 22, 23 and ending with a greater radius of curvature at reference point 30.

The plurality of upper edges 24, 25, 26, 27 define a horizontal plane 31 (see FIG. 2). Notice that the bottom wall 20 provides a first or higher ramp section 32 that extends to this horizontal plane 31, meeting upper edge 26 (see FIG. 2). This arrangement concentrates items to be cooked closer to the intersection (see seam or joint 21 reference point 30 in FIG. 2) of bottom wall 20 and rear wall 19. In the drawings, a vertical reference line 33 is positioned exactly halfway between the upper edge 26 and rear wall 19. Thus, the dimensions 34 and 35 are equal. However, a greater volume of liquid is contained in that part of the pot 11 interior 16 in between vertical reference line 33 and rear wall 19 when compared to the volume of liquid contained in pot 11 interior 16 in between vertical reference line 33 and upper edge 26. Deepest part 39 of pot 11 is thus in between reference line 33 and rear wall 19 at second ramp section 38.

Pot 11 can be provided with a pair of handles 36, 37 for enabling one or more users to lift the pot 11 from base 12 for purposes of cleaning, for example (see FIG. 1). The pot bottom wall 20 includes inclined first ramp section 32 and lesser inclined, lower second ramp section 38 (see FIG. 2).

Basket 40 has a size and shape that corresponds to pot 11. In this fashion, basket 40 fits into pot 11 interior 16 during cooking. Basket 40 pivotally attaches to pot 11 at one or more hinges or pivotal connections 41. Basket 40 has end walls 42, 43, rear wall 44 and bottom wall 45. A pair of handles 46, 47 can be provided for lifting basket 40 when emptying its contents. When the handles 46, 47 are lifted upwardly, basket 40 rotates upon its hinges or pivotal connections 41 with pot 11. Recesses at 48, 49 can be provided on pot 11 for receiving handles 46, 47.

Basket 40 can be of a plurality of sheets of welded aluminum material or the like, perforated with perforations or openings 50. As with the pot 11, basket 40 provides a first inclined ramp section 64 and a lesser inclined second ramp section 83 (see FIG. 8).

Figure 6:
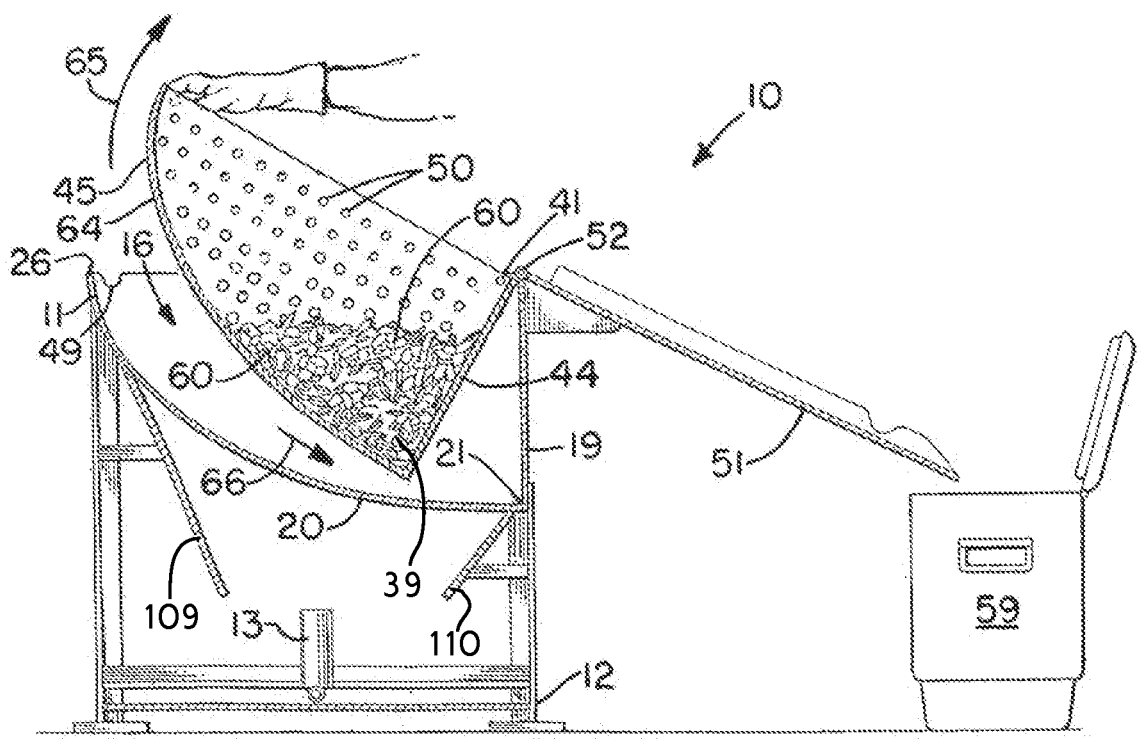
FIG. 6 is a side sectional view of a preferred embodiment of the apparatus of the present invention.
Figure 7:
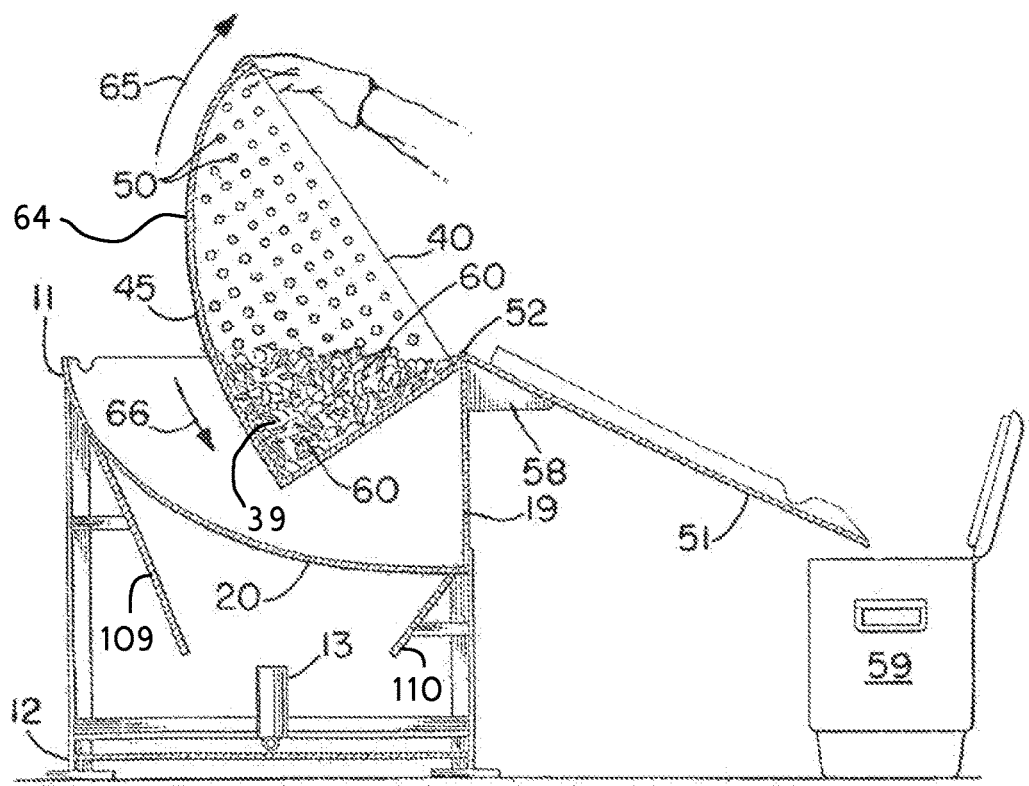
FIG. 7 is a side sectional view of a preferred embodiment of the apparatus of the present invention.
Figure 8:
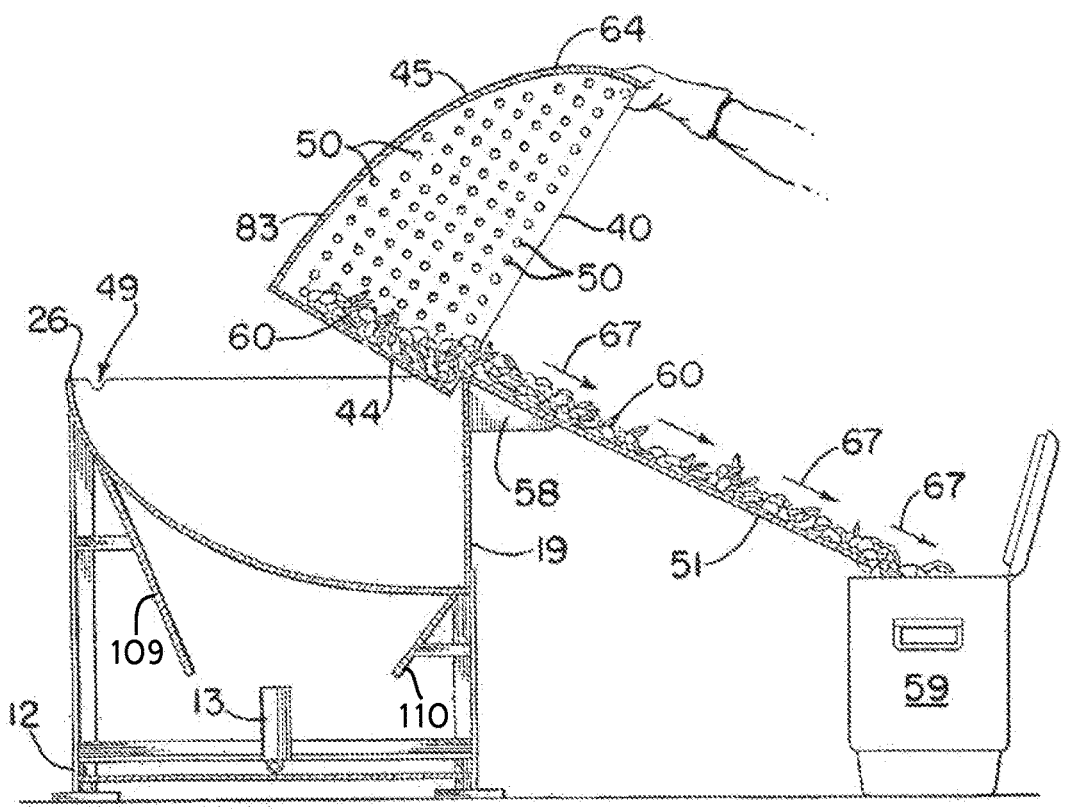
FIG. 8 is a side sectional view of a preferred embodiment of the apparatus of the present invention.
Figure 9:
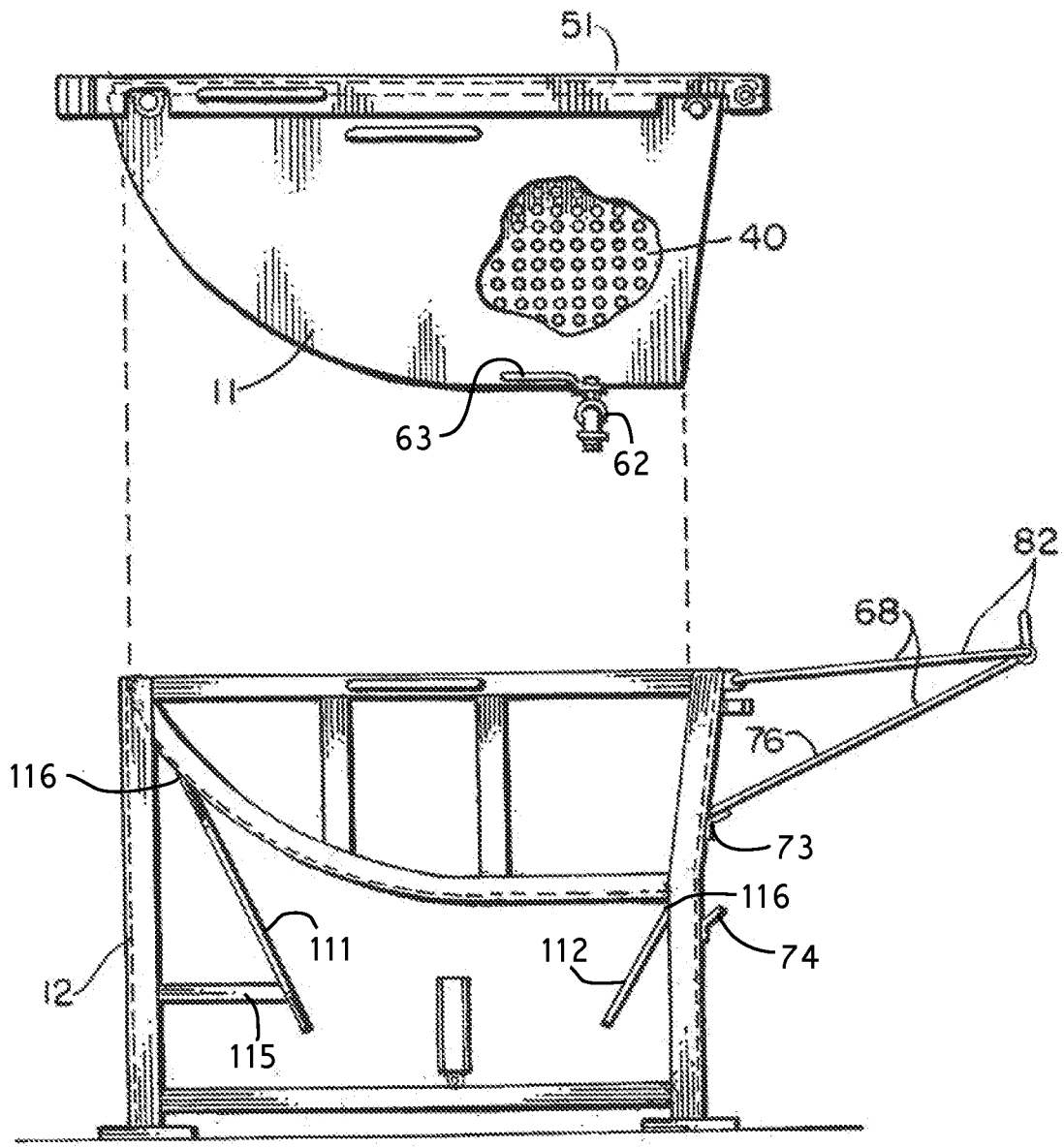
FIG. 9 is an elevation view of an alternate embodiment of the apparatus of the present invention.
Figure 10:
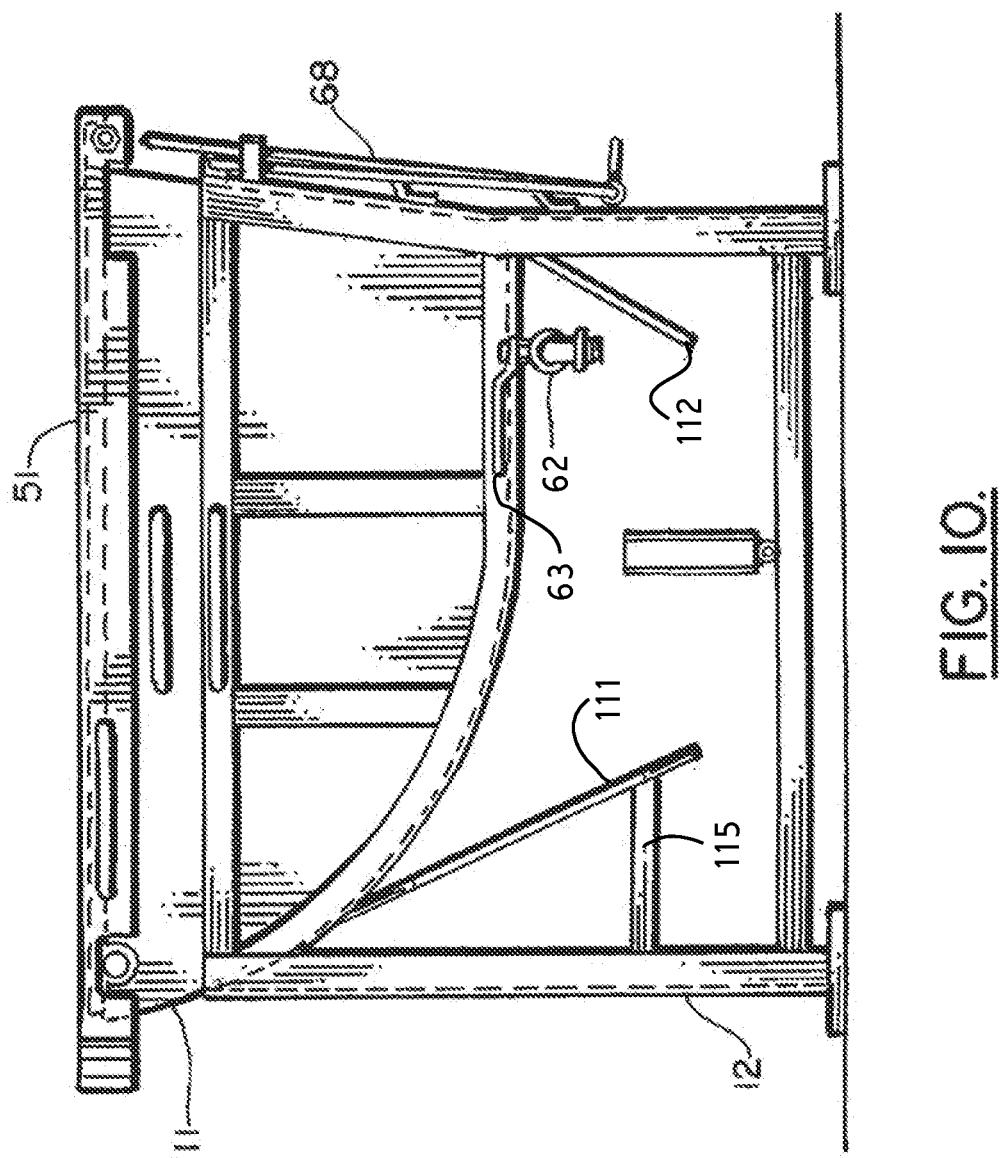
FIG. 10 is an elevation view of an alternate embodiment of the apparatus of the present invention.
Figure 11:
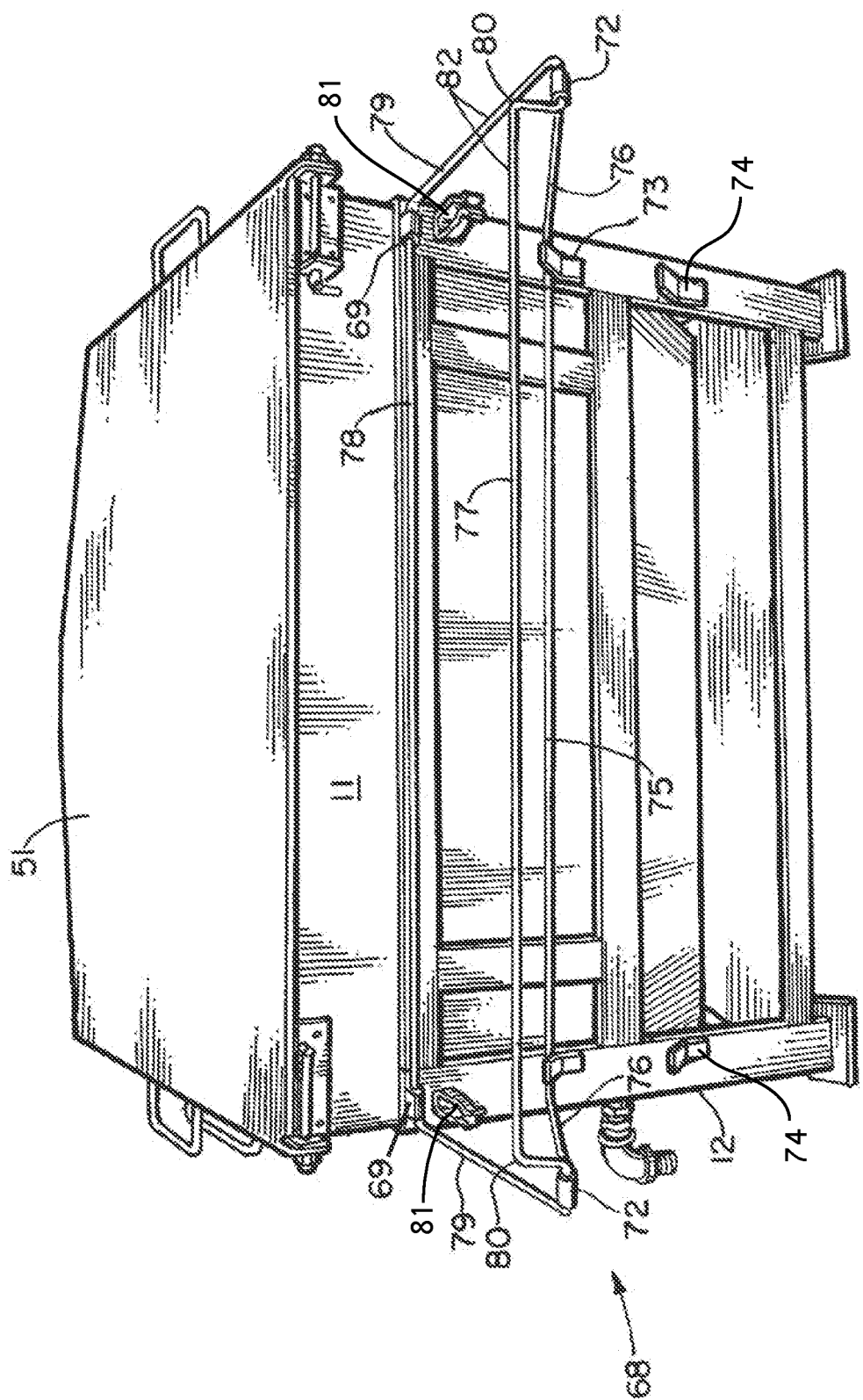
FIG. 11 is a perspective view of an alternate embodiment of the apparatus of the present invention.
Figure 12:
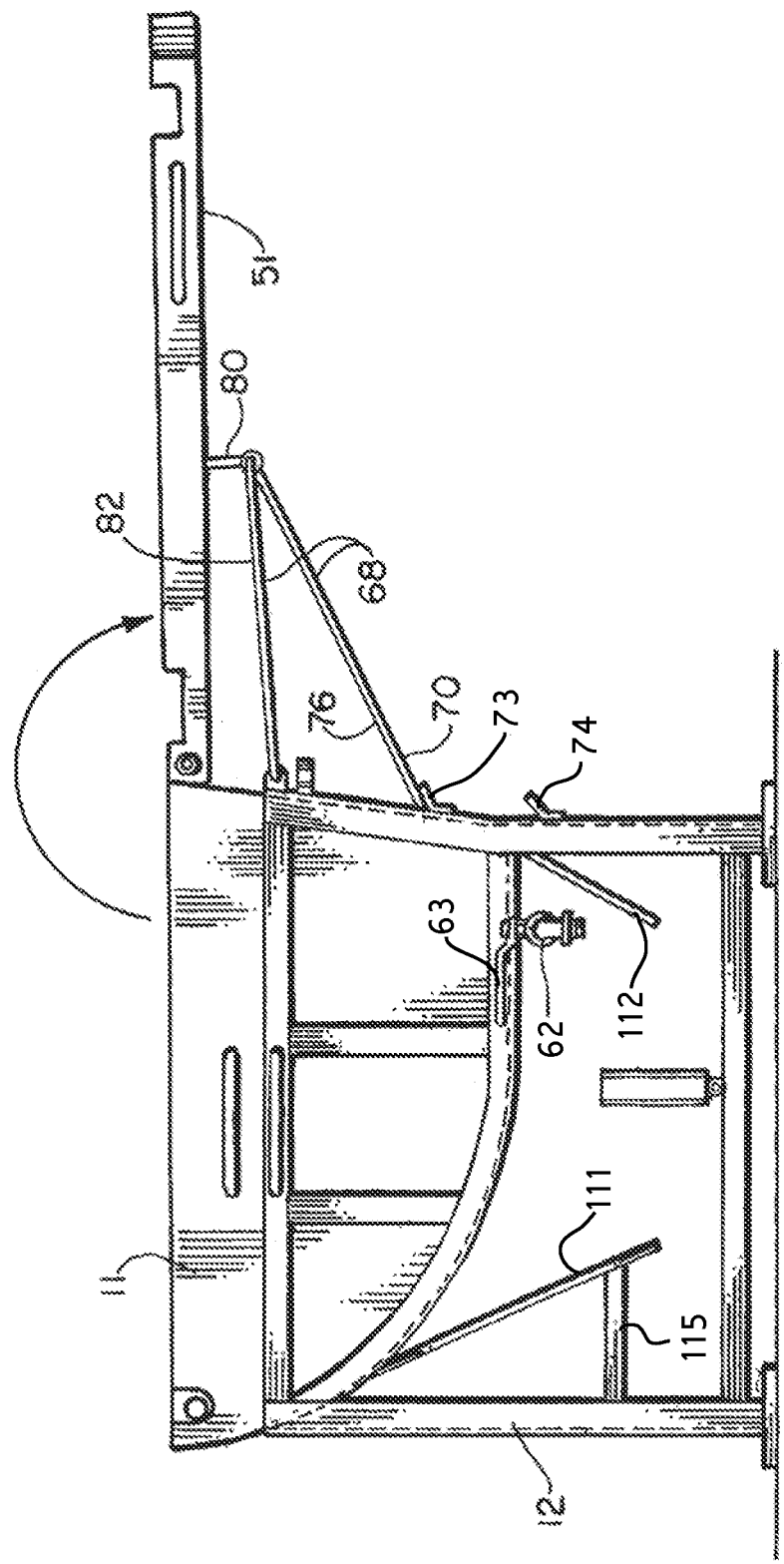
FIG. 12 is a side view of an alternate embodiment of the apparatus of the present invention.
Figure 13:
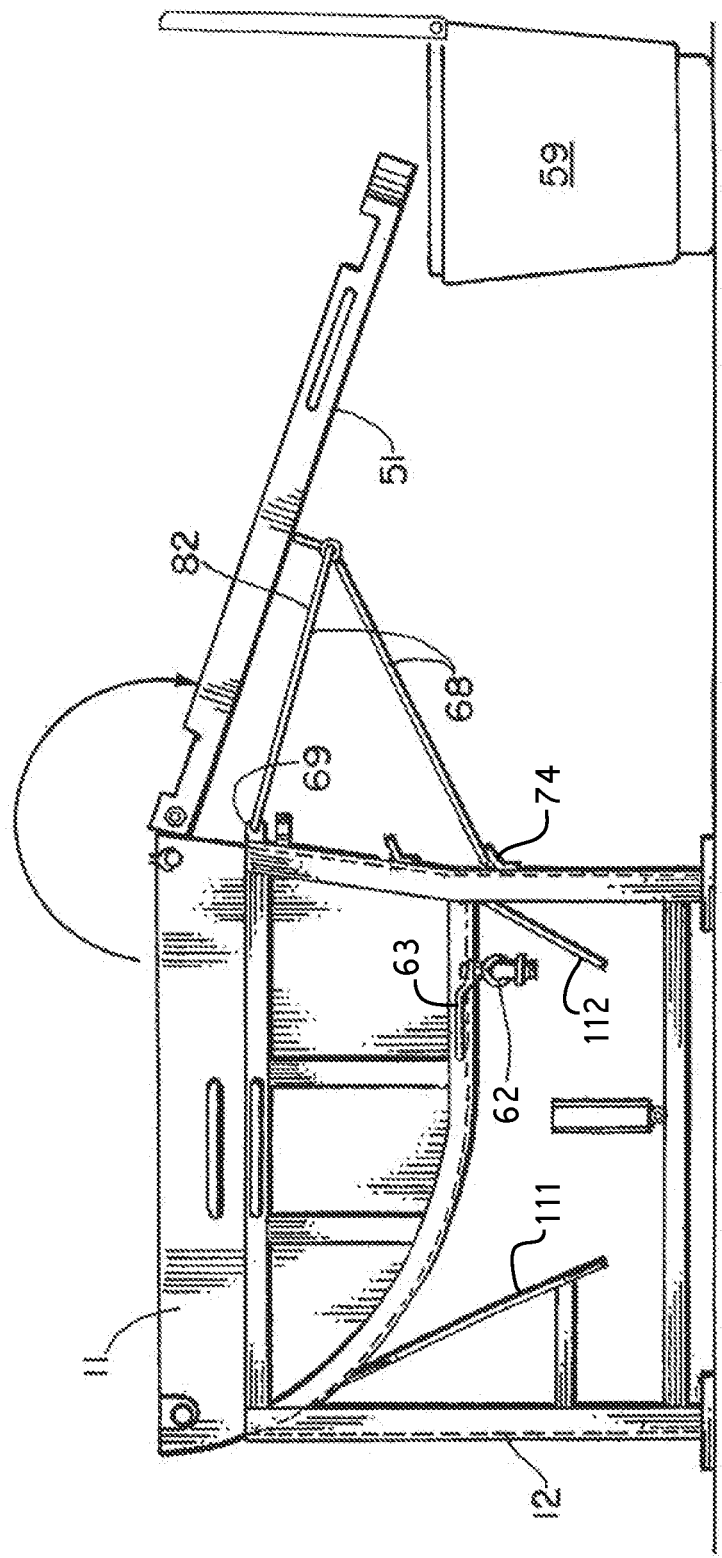
FIG. 13 is a side view of an alternate embodiment of the apparatus of the present invention.

When the handles 46, 47 (see FIG. 3) are lifted upwardly, basket 40 rotates as illustrated by arrow 65 in FIGS. 6-7 from a cooking position (FIG. 5) to a discharge position (FIG. 8). When this occurs, any seafood items 60 that are being cooked are canned, biased or pushed in the direction of arrow 66 by inclined ramp section 64 so that they very quickly occupy the deepest part 39 of basket 40 which is that portion in between vertical reference line 33 and basket rear wall 44. This arrangement concentrates the food items 60 to be lifted very close to pivotal connection or hinge 41. In this fashion, the apparatus of the present invention can cook very large volumes or pounds of seafood such as for example, 100-200 pounds of seafood items and yet still easily discharge those food items 60 from basket 40 to lid 51.

Lid 51 attaches at hinges 52 in a pivotal fashion to pot 11. Lid 51 can provide a pair of handles 53, 54 for lifting the lid 51 from a cooking position wherein it covers the open top of pot 11 to a discharge position (FIG. 8) wherein the lid 51 rotates about 180 degrees or preferably more than 180 degrees. The lid 51 can be provided with side walls 55, 56 for preventing escape of food items 60 that are discharged from basket 40 to lid 51 when lid 51 is in the open or food discharge position. In FIG. 8, food items 60 travel upon lid 51 to container 59 as indicated by arrow 67. Food items 60 can slide upon lid 51 via gravity or be pushed using a spoon, paddle or other utensil. Stops or lid supports 57, 58 can be provided for limiting the degree of opening of lid 51 relative to pot 11. After cooking is complete, fluid contained within pot 11 can be drained via fluid outlet fitting 61 and valve 62. Valve 62 can be provided with a valve handle 63 for opening and closing the valve.

FIGS. 9-13 show an alternate arrangement for supporting the lid 51 in an open position such as when food items 60 are to be discharged from the pot 11 after cooking is complete. In this alternate arrangement of FIGS. 9-13, the lid 51 can be selectively supported in one of multiple positions. The pot 11 and basket 40 can be similarly configured to the frame 12, pot 11 and basket 40 shown in FIGS. 1-8. For example, the lid 51 can be supported in a generally horizontal open position (FIG. 12) or in an inclined open position that forms an obtuse angle with the plane 31 that is defined by upper edges 24-27 of the pot 11 (see FIG. 13). In the horizontal open position, food items 60 discharged from pot 11 to the opened lid 51 remain on the lid 51 for further transfer to plates, trays, or other vessels. In the inclined position of FIG. 13, the food items discharged to the lid 51 slide downwardly into a large receptacle such as a bucket, basket, ice chest or the like 59 as the lid 51 functions as a discharge ramp.

Baffle plates 111, 112 can be similarly supported on frame or base 12 in an inclined position. Each baffle plate 111, 112 can be secured to frame or base 12 with connector 115 that extends from frame 12 to a position along the edge of plate 111, 112. The top portion of plates 111, 112 can be secured to frame 12 with a welded connection 116. Each plate 111, 112 starts at a position at the pot bottom and extends to a position about even with the top of a burner element 13.

FIGS. 9-13 show a lid support 68 that enables support of lid 51 in one of multiple selected positions for enabling receipt by lid 51 of food items 60 that are discharged from pot 11 and basket 40. Lid support 68 includes an upper frame 82 that is hingedly attached to the frame or base 12 using hinges 69 (see FIG. 11). Each hinge 69 supports a shaft 78 portion of the lid support 68. The shaft 78 can be supported by two, three or more hinges 69. Shaft 78 connects at its end portions to arms 79. Each arm 79 is connected to horizontal section 77. Horizontal section 77 can be parallel to and spaced from shaft 78. There can be a bend 80 at the joint between each arm 79 and horizontal section 77. When lid 51 is opened, it rests upon horizontal section 77.

Diagonal support 70 holds upper frame 82 in the selected position. Diagonal support 70 includes support arms 76, horizontal section 75 and pivots or bushings or hinges 72. These pivots, bushings or hinges 72 define a pivotal connection at horizontal section 77 between upper frame 82 and diagonal support 70. Horizontal section 75 can be selectively supported in an upper position by upper receptacles or hooks 73 (see FIGS. 11, 12) or in a lower position by lower receptacles or hooks 74 (see FIGS. 11, 12, 13). In the upper position of FIG. 12, the upper frame 82 is generally horizontally positioned to support the lid 51 in an upper, generally horizontal position. In this upper generally horizontal position of FIG. 12, the lid 51 retains food items 60 that are discharged to it from pot 11 and basket 40. In the lower position of FIG. 13, lid 51 is inclined so that food items discharged upon lid 51 from pot 11 and basket 40 slide upon lid 51 into a receptacle (e.g., ice chest 59) placed next to lid 51. It should be understood that other positions of the upper frame 82 could be provided by providing other hooks on frame 12 in addition to the upper and lower receptacles or hooks 73, 74. Clasp 81 is also included on frame 12.

In FIGS. 14-17, there can be seen an additional embodiment, designated by the numeral 90. Outdoor food boiler 90 has the same overall configuration of FIGS. 1-13 with the addition of steamer plate 89. Steamer plate 89 can be welded aluminum material or the like. Steamer plate 89 can be connected to basket 40 for enabling food items 60 to be steamed. In such a case, water is placed in pot 11 but filled to a level that is below the steamer plate 89. The steamer plate 89 can be removed when not needed, such as when food items 60 are to be boiled in pot 11. During steaming, the steamer plate 89 would be generally horizontally supported in basket 40 about one quarter to one half the distance between the top and bottom of basket 40. Plate 89 includes a horizontal, generally rectangular section 91 that is perforated having a matrix of openings 103.

Figure 14:
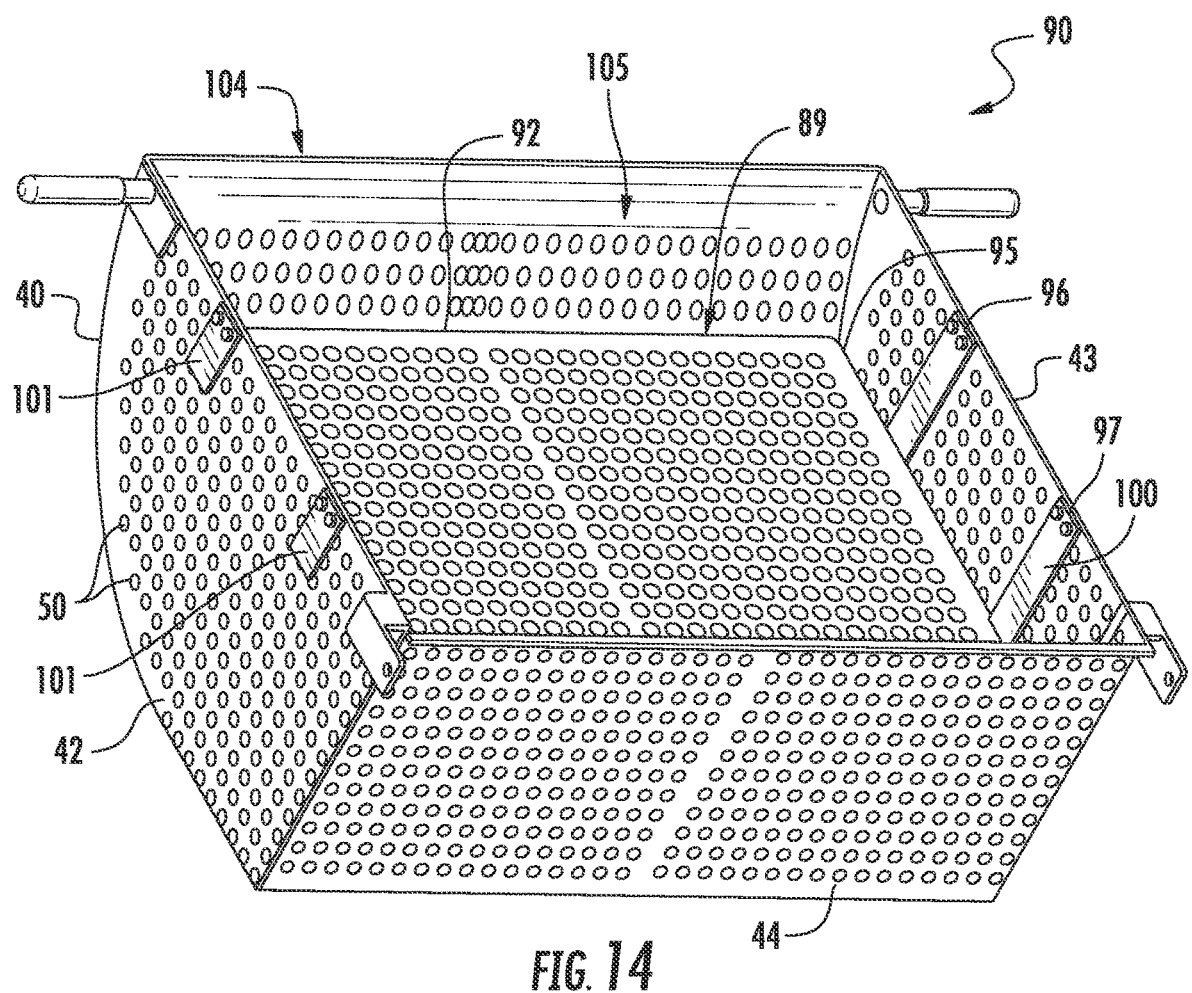
FIG. 14 is a perspective fragmentary view of another embodiment of the apparatus of the present invention.
Figure 15:
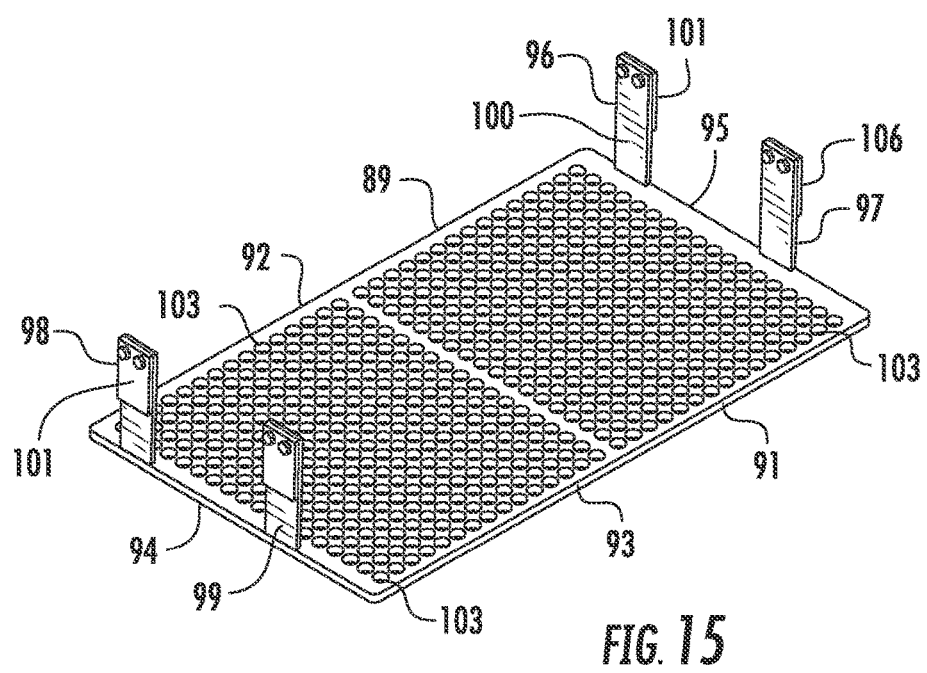
FIG. 15 is a fragmentary perspective view of the embodiment of FIG. 14.
Figure 16:
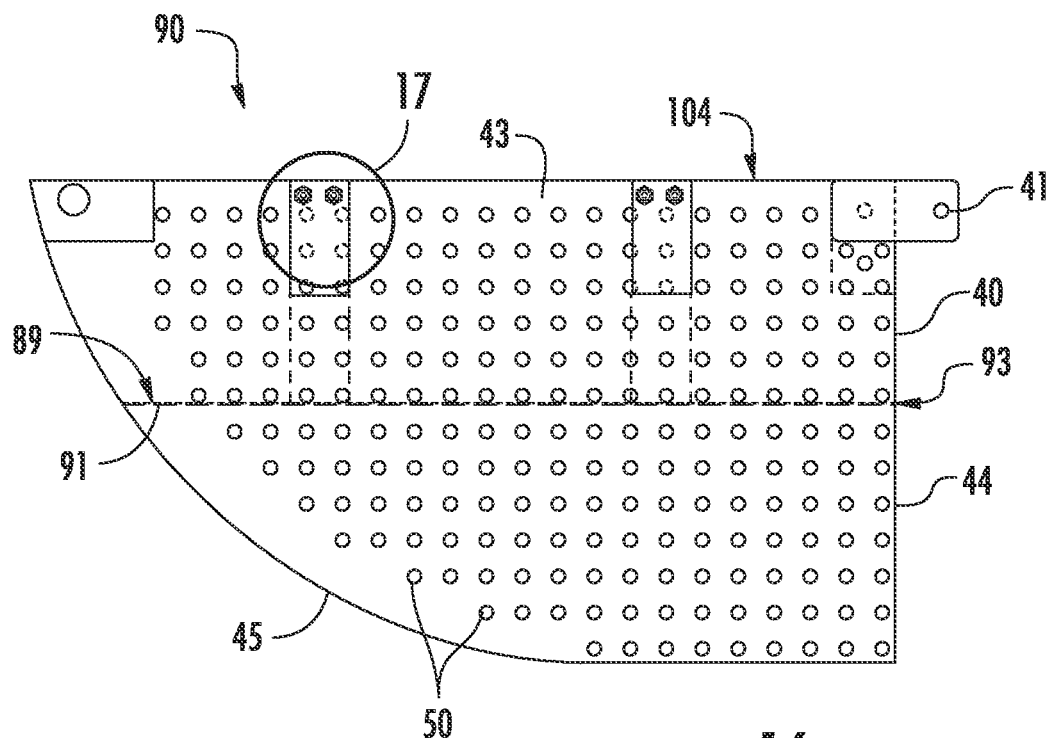
FIG. 16 is a fragmentary perspective view of the embodiment of FIG. 14.
Figure 17:
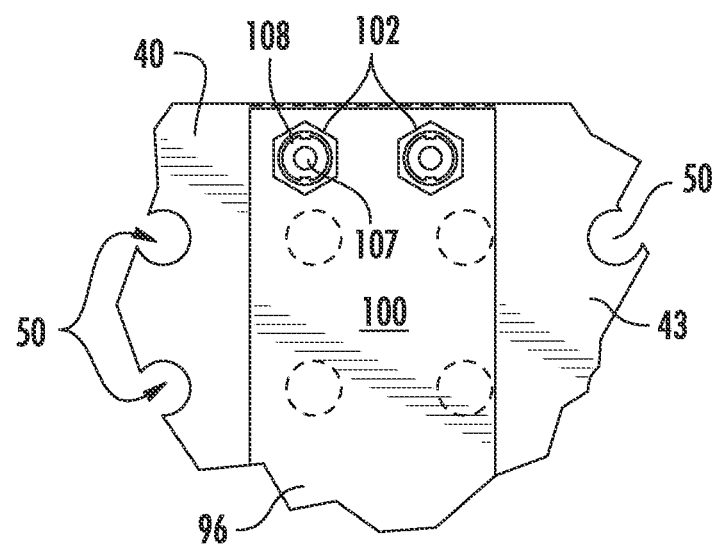
FIG. 17 is a fragmentary perspective view of the embodiment of FIG. 14.

In FIGS. 14 and 16, basket 40 is shown fitted with steamer plate 89. Plate 89 includes a perforated or apertured rectangular section 91. Section 91 has front edge 92, rear edge 93 and side edges 94, 95. Attached to rectangular section 91 are a plurality of hangers 96, 97, 98, 99 that enable rectangular section 91 to be supported from rim 104 of basket 40. Hangers 96, 97 attach to rim 104 at end wall 43. Hangers 98, 99 attach to rim 104 at end wall 42.

Each hanger 96, 97, 98, 99 can include a larger flange 100 which is an inner flange that occupies basket 40 interior 105 as seen in FIG. 14. Each hanger 96-99 has a smaller flange 101 that is an outer flange. The flanges 100, 101 are spaced apart at least the thickness of the end wall 42 or 43 to provide a gap 106 that is receptive of an end wall 42 or 43. Bolted connections (bolt 107, nut 108) 102 can be provided to affix a hanger 96-99 to an end wall 42, 43. Holes or apertures 103 could thus be provided in each flange 100, 101 for receiving a bolt 107 of such a bolted connection 102. The bolt 107 could also pass through an opening 50 in basket 40 (see FIG. 17).

PARTS LIST

The following is a list of parts and materials suitable for use in the present invention:

| Parts Number | Description |
| --- | --- |
| 10 | outdoor food boiler |
| 11 | pot |
| 12 | base/frame |
| 13 | burner element |
| 14 | fuel supply line |
| 15 | influent fitting |
| 16 | pot interior |
| 17 | end wall |
| 18 | end wall |
| 19 | rear wall |
| 20 | bottom wall |
| 21 | seam/joint |
| 22 | curved joint/seam |
| 23 | curved joint/seam |
| 24 | upper edge |
| 25 | upper edge |
| 26 | upper edge |
| 27 | upper edge |
| 28 | curvature |
| 29 | reference point |
| 30 | reference point |
| 31 | horizontal plane |
| 32 | first ramp section/higher ramp section |
| 33 | vertical line |
| 34 | dimension |
| 35 | dimension |
| 36 | handle |
| 37 | handle |
| 38 | second ramp section/lower ramp section |
| 39 | deepest part |
| 40 | basket |
| 41 | hinge(s)/pivotal connection(s) |
| 42 | end wall |
| 43 | end wall |
| 44 | rear wall |
| 45 | bottom wall |
| 46 | handle |
| 47 | handle |
| 48 | recess |
| 49 | recess |
| 50 | perforation/opening |
| 51 | lid |
| 52 | hinge |
| 53 | handle |
| 54 | handle |
| 55 | side wall |
| 56 | side wall |
| 57 | stop/lid support |
| 58 | stop/lid support |
| 59 | container/receptacle/ice chest |
| 60 | seafood items/food items |
| 61 | fluid outlet fitting |
| 62 | valve |
| 63 | valve handle |
| 64 | inclined ramp section |
| 65 | arrow |
| 66 | arrow |
| 67 | arrow |
| 68 | lid support |
| 69 | hinge(s) |
| 70 | diagonal support |
| 72 | hinge/bushing/pivot |
| 73 | upper receptacle/hook |
| 74 | lower receptacle/hook |
| 75 | horizontal section |
| 76 | support arm |
| 77 | horizontal section |

-continued

| Parts Number | Description |
| --- | --- |
| 78 | shaft |
| 79 | arm |
| 80 | bend |
| 81 | clasp |
| 82 | upper frame |
| 83 | lesser inclined second ramp section |
| 84 | legs or feet |
| 85 | flame or flames |
| 86 | burner jet |
| 87 | open ended pipe or tube |
| 88 | fuel supply hose |
| 89 | steamer plate |
| 90 | outdoor cooking apparatus |
| 91 | rectangular section |
| 92 | front edge |
| 93 | rear edge |
| 94 | side edge |
| 95 | side edge |
| 96 | hanger |
| 97 | hanger |
| 98 | hanger |
| 99 | hanger |
| 100 | inner flange |
| 101 | outer flange |
| 102 | bolted connection |
| 103 | perforation/opening/hole |
| 104 | basket rim |
| 105 | basket interior |
| 106 | gap |
| 107 | bolt |
| 108 | nut |
| 109 | baffle plate |
| 110 | baffle plate |
| 111 | baffle plate |
| 112 | baffle plate |
| 113 | connector |
| 114 | connector |
| 115 | connector |
| 116 | welded connection |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A seafood boiler apparatus, comprising:
a) a base;
b) a pot that rests upon the base, the pot having a bottom, side walls, an open top, and a pot interior;
c) basket that is sized and shaped to occupy the pot interior, the basket having an upper rim that includes a rim front edge, rim sides and a rear edge, the basket being pivotally connected to the pot at a pivot connection;
d) a pot lid that removably fits and covers the open top;
e) a moveable lid support that is attached to the base and that extends behind the base and below the pivot connection, the movable lid support enabling a support of the lid in selected first and second angular positions, including at least one supported position that forms a first angle with a horizontal plane in the first angular position, wherein the first angle is larger than an acute angle, and a second supported position at the second angular position that forms a second angle that is smaller than the first angle; and
f) wherein the movable lid support includes multiple connectors on the base at spaced apart positions and a moving frame that extends between the lid and a selected one of the connectors.

2. The seafood boiler apparatus of claim 1, further comprising a steamer plate that fits inside the basket.

3. The seafood boiler apparatus of claim 1, wherein the pivot connection includes a hinge.

4. The seafood boiler apparatus of claim 1, wherein the lid is rotatably attached to the pot.

5. The seafood boiler apparatus of claim 1, wherein the pot has a pot shallow end portion and a pot deep end portion, and the pivot connection includes a hinge mounted above the pot deep end portion, and the lid is rotatably attached to the pot.

6. The seafood boiler apparatus of claim 1, further comprising a burner supported by the base, one or more inclined baffle plates supported on the base, wherein the burner includes a burner top.

7. The seafood boiler apparatus of claim 6, wherein one or more baffle plates extend from a position near the pot bottom to a position about even with the burner top.

8. The seafood boiler apparatus of claim 1, wherein, in both the first and second angular positions, the lid is oriented non-vertically.

9. The seafood boiler apparatus of claim 7, wherein the lid has first and second ends, and in the first and second supported open positions the second end is spaced farther apart from the frame than the first end is spaced from the frame.

10. The seafood boiler apparatus of claim 7, wherein the frame includes vertically spaced apart first and second receptacles; and in the first supported open position the movable support is detachably connected to the first receptacle; and in the second supported open position the movable support is detachably connected to the second receptacle.

11. The seafood boiler apparatus of claim 7, wherein the movable support includes first and second arms that are rotatably connected to each other.

12. The seafood boiler apparatus of claim 11, wherein the first arm is rotatably connected to the frame and the second arm is detachably connectable to the frame.

13. The seafood boiler apparatus of claim 11, wherein the frame includes a hook which is detachably connectable to the second arm.

14. The seafood boiler apparatus of claim 11, wherein the frame includes a "V" shaped receptacle which is detachably connectable to the second arm.

15. A seafood boiler apparatus comprising:
a) a frame having a pot support;
b) a burner element supported by the frame;
c) a pot that removably fits the frame, the pot having end walls, a rear portion, a front portion, a bottom wall, and a pot interior with pot upper opening;
d) a basket that is pivotally attached to the pot, the basket being correspondingly sized and shaped to the pot so that it fits within the pot interior, the basket being movable between cooking and food discharge positions;
e) a lid that is rotatable relative to the pot, and selectably supportable in multiple open positions by a moveable support, the lid being movable between a cooking position and the multiple open positions wherein the lid is supported by the moveable support, wherein in the first supported open position the lid forms a first supported open position angle with the cooking position of the lid and further when in the first supported open position, the lid forms a generally horizontally positioned tray for receiving and supporting food discharged from the basket; and
f) wherein in the second supported open position the lid is supported by the movable support and the lid forms a second supported open position angle with the cooking position of the lid, the second supported open position angle being greater than the first supported open position angle, and the lid in the second supported open position providing support to the received food discharged from the basket while also allowing the received food discharged from the basket to slide relative to the lid, at the second supported open position angle and away from the pot interior.

16. The seafood boiler apparatus of claim 15, wherein the lid has a range of rotation from the cooking position to a maximum open position, and in the maximum open position, the lid forms a maximum open angle with the cooking position of the lid which maximum open angle is greater than both the first and second supported open position angles.

17. The seafood boiler apparatus of claim 15, wherein, in the second supported open position, the lid is oriented non-vertically.

* * * * *